(12) United States Patent
Huang et al.

(10) Patent No.: US 11,735,332 B2
(45) Date of Patent: Aug. 22, 2023

(54) THERMAL BARRIER MATERIAL FOR A RECHARGEABLE ELECTRICAL ENERGY STORAGE SYSTEM

(71) Applicant: 3M INNOVATIVE PROPERTIES COMPANY, St. Paul, MN (US)

(72) Inventors: Mitchell T. Huang, Austin, TX (US); Kerstin C. Rosen, Cologne (DE); Claus H. G. Middendorf, Neuss (DE); Christoph Kuesters, Korschenbroich (DE); Jan Thomas Krapp, Dusseldorf (DE); Donald A. Gagnon, Franklin, NH (US); Amy Douglass, Austin, TX (US); Robert H. Turpin, Hill, NH (US)

( * ) Notice: Subject to any disclaimer, the term of this patent is extended or adjusted under 35 U.S.C. 154(b) by 0 days.

(21) Appl. No.: 17/597,867

(22) PCT Filed: Jul. 31, 2020

(86) PCT No.: PCT/US2020/044442
§ 371 (c)(1),
(2) Date: Jan. 27, 2022

(87) PCT Pub. No.: WO2021/022130
PCT Pub. Date: Feb. 4, 2021

(65) Prior Publication Data
US 2022/0262539 A1    Aug. 18, 2022

Related U.S. Application Data

(60) Provisional application No. 62/961,410, filed on Jan. 15, 2020, provisional application No. 62/929,127, (Continued)

(51) Int. Cl.
*H01B 3/08* (2006.01)
*H01M 10/625* (2014.01)
(Continued)

(52) U.S. Cl.
CPC .............. *H01B 3/08* (2013.01); *B32B 5/022* (2013.01); *B32B 5/028* (2013.01); *B32B 5/266* (2021.05);
(Continued)

(58) Field of Classification Search
CPC .... H01B 3/08; H01M 10/625; H01M 10/658; H01M 50/249; H01M 50/24;
(Continued)

(56) References Cited

U.S. PATENT DOCUMENTS 3,082,133 A  *  3/1963  Hofmann ................. H01B 3/06
                                                    428/355 R
4,361,659 A     11/1982  Friedemann
(Continued)

FOREIGN PATENT DOCUMENTS

CN          101059031       10/2007
CN          108865039       11/2018
(Continued)

OTHER PUBLICATIONS

Bonding And Coating Applications of PQ® Soluble Silicates, Industrial Chemical Division, PQ Corporation, Bulletin 12-31, 2006, 7 pages.
(Continued)

*Primary Examiner* — Jennifer A Boyd
(74) *Attorney, Agent, or Firm* — Gregg H. Rosenblatt (57) ABSTRACT

A multilayer material for use as a thermal insulation barrier and/or flame barrier in a rechargeable electrical energy storage system is provided. The multilayer material comprises at least one inorganic fabric layer bonded to a nonwoven layer comprising inorganic particles and inorganic fibers by an inorganic adhesive, wherein the inorganic adhesive. The inorganic adhesive can be a modified inorganic adhesive comprising at least 99 wt. % inorganic
(Continued)

constituents and an organic additive of at least 0.01 wt. % and less than 1 wt. % based on a total solids content of the inorganic adhesive.

19 Claims, 1 Drawing Sheet

Related U.S. Application Data filed on Nov. 1, 2019, provisional application No. 62/881,491, filed on Aug. 1, 2019.

(51) Int. Cl.
| | |
|---|---|
| *H01M 10/658* | (2014.01) |
| *H01M 50/249* | (2021.01) |
| *H01M 50/24* | (2021.01) |
| *H01M 50/276* | (2021.01) |
| *H01M 50/282* | (2021.01) |
| *B32B 5/26* | (2006.01) |
| *B32B 5/02* | (2006.01) |
| *B32B 7/12* | (2006.01) |
| *B32B 29/02* | (2006.01) |
| *C03C 25/1095* | (2018.01) |
| *C03C 25/42* | (2006.01) |
| *C09K 21/02* | (2006.01) |

(52) U.S. Cl.
CPC ............... *B32B 5/273* (2021.05); *B32B 7/12* (2013.01); *B32B 29/02* (2013.01); *C03C 25/1095* (2013.01); *C03C 25/42* (2013.01); *C09K 21/02* (2013.01); *H01M 10/625* (2015.04); *H01M 10/658* (2015.04); *H01M 50/24* (2021.01); *H01M 50/249* (2021.01); *H01M 50/276* (2021.01); *H01M 50/282* (2021.01); *B32B 2250/20* (2013.01); *B32B 2255/02* (2013.01); *B32B 2255/20* (2013.01); *B32B 2262/101* (2013.01); *B32B 2262/105* (2013.01); *B32B 2262/108* (2013.01); *B32B 2307/206* (2013.01); *B32B 2307/304* (2013.01); *B32B 2307/3065* (2013.01); *B32B 2307/718* (2013.01); *B32B 2307/732* (2013.01); *B32B 2457/10* (2013.01); *H01M 2220/20* (2013.01)

(58) Field of Classification Search
CPC ... H01M 50/276; H01M 50/282; B32B 5/266; B32B 5/273; B32B 5/022; B32B 5/028; B32B 7/12; B32B 29/02; C03C 25/1095; C03C 25/42; C09K 21/02

USPC .......................................................... 429/163
See application file for complete search history.

(56) References Cited

U.S. PATENT DOCUMENTS

| | | | |
|---|---|---|---|
| 4,437,893 A | | 3/1984 | Krinski |
| 5,238,518 A | * | 8/1993 | Okubi ................. C09J 1/00 501/12 |
| 5,765,332 A | | 6/1998 | Landin et al. |
| 6,056,816 A | | 5/2000 | Hagens |
| 6,746,781 B2 | | 6/2004 | Francis |
| 8,541,126 B2 | | 9/2013 | Hermann |
| 8,808,495 B2 | | 8/2014 | Carlson |
| 9,321,243 B2 | | 4/2016 | Fernando |
| 2006/0164795 A1 | | 7/2006 | Jones |
| 2009/0104425 A1 | | 4/2009 | Nandi et al. |
| 2012/0107547 A1 | * | 5/2012 | Fernando .................. B32B 5/26 428/324 |
| 2014/0318069 A1 | | 10/2014 | Moennig et al. |

FOREIGN PATENT DOCUMENTS

| | | |
|---|---|---|
| EP | 3142166 | 3/2017 |
| EP | 3269540 | 1/2018 |
| JP | H1017824 A | 1/1998 |
| KR | 20090095822 | 9/2009 |
| KR | 20090095822 A | 9/2009 |
| KR | 101792749 B1 | 10/2017 |
| WO | WO 2005-071033 | 8/2005 |
| WO | 2015179597 A1 | 11/2015 |
| WO | 2019088195 A1 | 5/2019 |
| WO | WO 2020-023357 | 1/2020 |

OTHER PUBLICATIONS

Doring, "Initializing of Thermal Runaway for Lithium-Ion cells", Workshop JRC, Mar. 2018, 34 pages.
Global Technical Regulation on Electric Vehicle Safety (EVS), Addendum 20: Global Technical Regulation No. 20, May 3, 2018, 171 pages.
International Search Report for PCT International Application No. PCT/IB2020/044442, dated Oct. 19, 2020, 3 pages.
Product Data Sheet, 3M Interam(TM) E-5 Series Mats, Endothermic Ceramic Fiber Blanket (1999); 3M Specified Construction Products Department, St. Paul, MN.
Safety Data Sheet, 3M(TM) Interam(TM) Endothermic Mat E-5A-4, E-54A, E-54C, Version No. 3.05 (Aug. 28, 2020), 10 pp.
Safety Data Sheet, 3M Interam(TM) I-10A and I-10 MATS, Version 18.02 (Jan. 18, 2018); 10 pp.
Search Report for CN Appl. No. 202080055510.2, dated Jun. 22, 2022, 2 pp.

* cited by examiner

THERMAL BARRIER MATERIAL FOR A RECHARGEABLE ELECTRICAL ENERGY STORAGE SYSTEM

BACKGROUND OF THE INVENTION

The invention relates to the use of a multilayer material as a thermal insulation barrier in a rechargeable electrical energy storage system comprising for example a plurality of single rechargeable battery cells or battery cell modules in a battery pack. In particular, the present invention relates to electric vehicle battery modules and particularly to blast and thermally resistant barrier articles for managing battery module thermal runaway incidents.

Rechargeable or reloadable batteries or rechargeable electrical energy storage systems comprising a number of single battery cells, such as for example lithium-ion cells, are known and used in several fields of technique, including e.g. as electric power supply of mobile phones and portable computers or electric cars or vehicles or hybrid cars.

It is also known, that particularly rechargeable battery cells, such as lithium-ion cells, sometimes undergo internal overheating caused by events such as short circuits within the cell, improper cell use, manufacturing defects or exposure to extreme external temperature. This internal overheating can lead to a so called "thermal runaway" when the reaction rate within the cell caused by the high temperature increases to a point where more heat is generated within the cell than can be withdrawn and the generated heat leads to a further increase of the reaction rate and in turn of the generated heat. In lithium-ion (Li-ion) batteries, for example, the heat generated within such defective cells can reach 500° C. to 1000° C., in localized hot spots even more.

In particular, it is essential in such cases to interrupt or at least reduce a heat transfer from defective cells or cell packs to other parts of the storage system or around the storage system, because the heat generated in a defective battery cell or cell pack can spread out to the neighboring cells, which in turn can cause overheat and then undergo thermal runaway. Also, it is important to limit the heat transfer to parts around the storage system, which may get destroyed or harmed when treated with the above-mentioned temperatures, causing electrical shortages which in turn could lead to unwanted effects as further cells getting into a thermal runaway.

It is accordingly usual to provide safety precautions for protecting the environment of overheated battery cells or packs of battery cells against the generated heat, including, in particular, not yet affected battery cells or packs but also surrounding construction elements of the system or device or apparatus containing the battery cells.

For this purpose, it has e.g. been suggested to insert thermally insulating barrier elements inside of a storage system in order to prevent or reduce the heat transfer from an overheated battery cell or pack of battery cells to other battery cells or cell packs of batteries and/or to the environment of the storage system.

This is for example described in U.S, Publication No. 2006/0164795 (Jones et al.) or U.S. Pat. No. 8,541,126 (Hermann et al.). According to these prior art documents, the thermal barrier elements can e.g. consist of a ceramic material such as aluminum oxide, magnesium oxide, silicon dioxide, calcium silicates, calcium magnesium silicates or alumina silicates, which materials provide high melting temperatures of about 500° C. to about 1500° C. and more, i.e. well above the temperatures normally achieved even short time during a thermal runaway event in a battery, combined with a relatively low thermal conductivity, such as a thermal conductivity less than 50 W/m K (measured at 25° C.). Such ceramic elements can e.g. consist of plates produced by compressing a number of laminates of said ceramic materials impregnated with a resin of suitable temperature resistance.

In EP 3 142 166 A1 it has been disclosed a compressible composite material useful in particular as thermally insulating barrier element for batteries, which is a layered assembly of substantially rigid plates and compressible layers, which are alternately piled in direction vertical to their larges surface.

According to the Global Technical Regulation No. 20 which is the "Technical Regulation on the Electric Vehicle Safety (EVS)" of the United Nations, established in the global registry on Mar. 14, 2018, the following will be required for future vehicles:

In order to ensure the overall safety of vehicles equipped with a rechargeable electrical energy storage system (RE-ESS) containing flammable electrolyte, the vehicle occupants should not be exposed to the hazardous environment resulting from a thermal propagation (which is triggered by a single cell thermal runaway due to an internal short circuit). First goal is to suppress thermal propagation completely. If thermal propagation cannot completely be suppressed, it is requested that no external fire or explosion occurs, and no smoke enters the passenger cabin within 5 minutes after the warning of a thermal event.

A housing for a rechargeable energy storage system may for example be made out of aluminum or an organic polymer sheet molded compound. Both can be damaged as soon as temperatures of 600° C. and above are reached. Even steel casings may be at risk in certain situations such as for example a deformation of the casing due to an accident or a malfunctioning of an electrical insulation material. There is a risk that heat, and gas gets out of the housing as soon as there is a thermal runaway event within the housing that reaches temperatures that are higher than 600° C.

In order to be able to test, if products fulfil the above-mentioned requirements, several test methods have been developed, one of them is the so-called nail penetration test.

A further trend is to be noticed, especially in the automotive industry, which is that the rechargeable electrical energy storage systems are getting bigger and bigger and the energy density higher and higher in order to be able to carry more energy, which helps to extend the range a vehicle can drive with a fully charged storage system without recharging the storage system. If such bigger storage systems get defective, the following reactions might also get more intense, because of the higher energy stored in those systems. This might lead to higher temperatures.

Rechargeable batteries including Nickel Metal Hydride or Lithium-Ion (Li-Ion) are used in electric vehicles to store energy and to provide power. The flow of current either into the battery during recharge or out of the battery into the vehicle and its accessories generates heat, which needs to be managed/dissipated proportional to the square of the current multiplied by the internal resistance of the battery cells and interconnected systems. A higher current flow implies a more intensified heating effect.

Li-Ion batteries perform optimally within a specific operating temperature range. If operation occurs outside the bounds of the specified range, then damage or accelerated degradation of the cells within the battery occurs. Thus, the battery may also need to be cooled or heated depending upon environmental conditions. This, in turn, drives the need to effectively manage thermal aspects of the battery before and during use and recharge.

Electrical vehicle battery modules comprise hundreds of cells that may be stored in pouches connected to one another in packs through various electrical connections (i.e. busbars). A catastrophic phenomenon called thermal runaway propagation occurs when one cell in a battery module catches on fire because it is punctured, damaged, or faulty in its operation. The resulting fire spreads to neighboring cells and then to cells throughout the entire battery in a chain reaction. These fires can be potentially massive, especially in high power devices such as electric vehicles, where it is common to see battery packs containing tens, hundreds, or even thousands, of individual cells. Such fires are not limited to the battery and can spread to surrounding structures and endanger occupants of the vehicle or other structures in which these batteries are located.

When thermal runaway occurs in a cell, it is also desirable for a thermal management system to block and/or contain ejected debris if a cell suddenly explodes. In electric vehicle applications, it is also important to protect occupants from the heat generated by the fire, thereby allowing enough time to stop the vehicle and escape.

Severe risks posed by thermal runaway propagation requires design of the battery module that features blast and thermally insulating barriers to mitigate the effects of such a thermal runaway and provide time for vehicle occupants to safety vacate in the event of a fire.

SUMMARY

In view of the above, there is still a need to provide suitable materials and suitable arrangements that help preventing or delaying thermal propagation within a rechargeable electrical energy storage system as well as heat transfer to parts around or outside of a rechargeable electrical energy storage system, which may get destroyed or harmed when treated with the above-mentioned conditions and temperatures. There is also a need for such suitable materials that are easy to use in an assembly process and provide flexibility with designing rechargeable electrical energy storage systems.

The present invention relates to electric vehicle battery modules and particularly to blast and thermally resistant barrier articles for managing battery module thermal runaway incidents. The provided articles can be especially useful, for example, in automotive or other electrified transportation applications and stationary energy storage applications.

In an exemplary embodiment, the present invention provides the use of a multilayer material as a thermal insulation barrier in a rechargeable electrical energy storage system, with the multilayer material comprising at least one inorganic fabric, as well as at least one layer comprising inorganic particles or inorganic fibers or a combination thereof.

In second embodiment, a multilayer material for use as a thermal insulation barrier and/or flame barrier in a rechargeable electrical energy storage system is provided. The multilayer material comprises at least one inorganic fabric layer bonded to a nonwoven layer comprising inorganic particles and inorganic fibers by an inorganic adhesive, wherein the inorganic adhesive is a modified inorganic adhesive comprising at least 99 wt. % inorganic constituents and an organic additive of at least 0.01 wt. % and less than 1 wt. % based on a total solids content of the inorganic adhesive.

In a third embodiment, a multilayer material for use as a flame barrier in a rechargeable electrical energy storage system is provided. The multilayer material comprises an inorganic paper made of glass fibers and microfibers, inorganic particles or particulate fillers and an organic binder and a coated glass fiber fabric layer bonded to a major surface of the inorganic paper by an inorganic adhesive.

In a fourth embodiment, a multilayer material for use as a flame barrier in a rechargeable electrical energy storage system is provided. The multilayer material comprises a first inorganic fabric layer bonded to a first major surface of a nonwoven layer comprising inorganic particles and inorganic fibers by an inorganic adhesive; and a second inorganic fabric layer bonded to a second major surface of the nonwoven layer by the inorganic adhesive, wherein the inorganic adhesive is a modified inorganic adhesive comprising at least 99 wt. % inorganic constituents and organic additive of at least 0.01 wt. % and less than 1 wt. % based on a total solids content of the inorganic adhesive.

In a fifth embodiment, a multilayer material for use as a flame barrier in a rechargeable electrical energy storage system is provided. The multilayer material comprises a first coated glass fiber fabric layer bonded to a first major surface of an inorganic paper made of glass fibers and microfibers, inorganic particulate fillers and an organic binder by an inorganic adhesive; and a second coated glass fiber fabric layer bonded to a second major surface of the inorganic paper.

In another aspect, present invention provides a rechargeable electrical energy storage system with at least one battery cell and/or module and a multilayer material, with the multilayer material being used as a thermal insulation barrier and/or a flame barrier. The multilayer material comprises at least one inorganic fabric, as well as at least one layer comprising inorganic particles or inorganic fibers or a combination thereof.

Protecting against the dangers associated with a sudden thermal runaway event in an electric vehicle battery is a significant technical challenge. One problem in devising a universal solution is that materials that work well in protecting against one aspect of thermal runaway fall short in other ways. For example, non-woven webs of polymeric fibers and foams can display excellent thermal insulation properties, but common polymers tend to be flammable or the fibers and foams are coated with encapsulant materials that are flammable. Heat shield materials made from woven non-combustible fibers (e.g., inorganic fibers) can be effective in preventing penetration of a fire but tend to be too thin to adequately insulate against the intense heat of a fire or to absorb/deflect debris that is launched when a cell explodes. Using thicker layers of heat shield materials is generally not cost effective. Combinations of these materials could work, but it can be difficult to bond these materials to each other, particularly when the selection of bonding materials may be constrained by flammability issues.

Another technical difficulty arises when using fibers and foams used in conventional thermal management systems. Even fire-resistant fibers and foams are prone to melting at sufficiently high temperatures, for example, greater than 600° C. (1112° F.). Fibers and foams that would not melt during such thermal runaway events (e.g., oxidized polyacrylonitrile) tend to be relatively brittle and can introduce new problems associated with fiber shedding or loose material during product manufacture, intermediate handling, and use. Such fibers do not bind to each other within a fibrous web and thus alternative ways must be devised to secure these fibers, so they do not escape and contaminate other battery components and spaces surrounding the battery.

Current test methods insufficiently determine how a material alone or in combination with other materials may be effectively used as barriers in electric vehicle compartments to provide blast and thermal resistance protection. Also, current test methods use the actual battery components including cells and modules, which is expensive and time consuming.

BRIEF DESCRIPTION OF THE DRAWINGS

The invention will now be described in more detail with reference to the following figures exemplifying particular embodiments of the invention.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Definitions

As used herein:

"thermal barrier material" means a material designed to limit the spread or expansion of a thermal event. Thermal barrier materials of the present invention can reduce the transmission of heat or flame, as well as optionally providing protection from shrapnel during a thermal runaway event.

"thickness" means the distance between opposing sides of a layer or multilayer barrier article.

"fabric" means a pliable material or cloth produced by interlacing, weaving, knitting, or crocheting of inorganic fibers.

"fully hydrolyzed" in reference to its use in referring to a fully hydrolyzed polyvinyl alcohol (PVA) means that the degree of hydrolysis is greater than or equal to 98 mol % in the PVA polymer as determined by titration.

DETAILED DESCRIPTION OF THE EMBODIMENTS

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises", and variations thereof, do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, and vertical may be used herein and, if so, are from the perspective observed in the particular figure. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention.

The multilayer material according to the invention may be a flame barrier material which can be used to improve the overall safety of vehicles equipped with a rechargeable electrical energy storage system. In an exemplary embodiment, the exemplary multilayer material comprises at least one inorganic fabric bonded to at least one layer comprising inorganic particles or inorganic fibers or a combination thereof. While the multilayer material may comprise two layers depending on the application, but it may also comprise more than two layers of the above-mentioned materials. The layers may be bonded together with either an organic adhesive or an inorganic adhesive. In an exemplary aspect, an inorganic adhesive is used to bond the at least one inorganic fabric to at least the one layer comprising inorganic particles or inorganic fibers because the inclusion of organic materials into the multilayer material may be detrimental the performance of the material during a thermal runaway event where the organic material may act as a fuel source.

A thermal runaway of prismatic Li-ion cells can basically be separated into 3 phases:
1. explosive venting when burst plate opens (e.g. 6 to 8 bar for a 120 Ah prismatic cell), the immediate temperature increases to about 700° C.;
2. high pressure jet gas venting and particle blow out at high temperature (typically 600 to 700° C. for about 30 to 50 sec);
3. quiet gas venting/luminous flame.

Thus, a suitable material used as a thermal insulation barrier to prevent thermal propagation needs to withstand high temperatures and high pressures accompanied by gas venting and particle blow without getting too damaged. In addition, the material needs to provide thermal and electrical insulation properties even during and after the high temperature, pressure and gas and/or particle impact.

The multilayer material according to the invention may be flexible. Flexibility of the multilayer material enables a broader use of the material and a more effective application of the material, because the flexibility allows bending of the material and therefore more options of applying it in one or the other way within a rechargeable electrical energy storage system. The multilayer material according to the invention may also be compressible. Compressibility may allow broader use and more effective application. For example, the material may be compressible such that the total thickness of the multilayer material is ⅓ less in the compressed state compared to an uncompressed state. If the multilayer material is for example 6 mm thickness in an uncompressed state it should be compressible down to 4 mm in a compressed state.

The multilayer material according to the invention may comprise an inorganic fabric made from inorganic fibers such as E-glass fibers, R-glass fibers, ECR-glass fibers, C-glass fibers, AR-glass fibers, basalt fibers, ceramic fibers, silicate fibers, steel filaments or a combination thereof. The fibers may be chemically treated. The inorganic fabric may for example be a woven fabric, a cloth, a knitted fabric, a stitch bonded fabric, a crocheted fabric, an interlaced fabric or a combination thereof. The inorganic fabric can improve the increased tensile strength, tear strength, and elongation to the multilayer composite, which can be helpful for industrial manufacturing and converting processes as well as protecting the other layers in the multilayer material from the thermal and mechanical impact during a thermal runaway event.

The inorganic fabric may for example comprise a thickness in the range of 0.3 to 3 mm, for example 0.4 to 1.5 mm, or 0.4 to 1 mm. The inorganic fabric may also comprise a basis weight of above 400 g/m$^2$ (gsm). The exemplary inorganic fabric can have a basis weight from 400 gsm to 6100 gsm. In some embodiments, the exemplary inorganic fabric will have a basis weight between 400 gsm to 1000 gsm.

In some embodiments, a surface finish or surface coating can be applied to the inorganic fabric, especially glass fiber fabrics, to enhance high temperature resistant to up to 700° C. or for short bursts up to 750° C. Exemplary surface coatings include calcium silicate, vermiculite, or a silica sol to enhance high temperature resistance. Exemplary surface coatings may also enhance the abrasion resistance of the inorganic fiber.

The multilayer material according to the invention may also comprise at least one nonwoven layer comprising inorganic particles or inorganic fibers or a combination thereof. The inorganic fibers of the at least one layer comprising inorganic particles or inorganic fibers may be selected from the group of E-glass fibers, S-glass fibers, R-glass fibers, ECR-glass fibers, C-glass fibers, AR-glass fibers, basalt fibers, ceramic fibers, polycrystalline fibers, non-bio-persistent fibers, alumina fibers, silica fibers, carbon fibers, silicon carbide fibers, boron silicate fibers or a combination thereof in the form of a nonwoven mat. Non-bio-persistent fibers may for example be alkaline earth silicate fibers. More specific, the fibrous material may include annealed melt-formed ceramic fibers, sol-gel formed ceramic fibers, polycrystalline ceramic fibers, alumina-silica fibers, glass fibers, including annealed glass fibers or non-bio-persistent fibers. Other fibers are possible as well, if they withstand the high temperatures generated in a thermal event of a Li-ion battery.

In some embodiments, the inorganic particles or inorganic particulate fillers may include, but are not limited to, glass bubbles, kaolin clay, talc, mica, calcium carbonate, wollastonite, montmorillonite, smectite, bentonite, illite, chlorite, sepiolite, attapulgite, halloysite, laponite, rectorite, perlite, and combinations thereof, preferably a particulate filler mixture comprises at least two of glass bubbles, kaolin clay, talc, mica, and calcium carbonate. Suitable types of kaolin clay include, but are not limited to, water-washed kaolin clay; delaminated kaolin clay; calcined kaolin clay; and surface-treated kaolin clay. In a preferred embodiment, the inorganic particulate filler comprises glass bubbles, kaolin clay, mica and mixtures thereof as described in such as the inorganic papers and board materials and laminates described in published Patent Cooperation Treaty application WO 2020/023357, incorporated herein by reference in its entirety. Optionally, an endothermic filler, such as alumina trihydrate, can be added.

In some embodiments, the exemplary material can comprise at least one nonwoven layer that is an inorganic paper or an inorganic board that comprises glass fibers and microfibers, inorganic particles, and an organic binder, such as 3M CEQUIN I Inorganic Paper, commercially available from 3M Company, St. Paul, Minn., USA. 3M CEQUIN I Inorganic Paper is approved for use as Major Insulation in Electrical Insulation Systems through Class 220(R) per UL 1446 and IEC Std 61857. Class 220(R) indicates that the maximum allowable operating temperature for the system is 220° C. at which the system can continuously operate while maintaining electrical integrity. It is surprising that the combination of a material having a maximum system operating temperature of up to 220° C. can be combined with a material such as a glass fabric which can withstand temperatures up to 600-650° C. or up to 750° C. in the case of a coated glass fabric to produce a material that is capable of withstanding temperatures up to 1000° C. or 2000° C. for at least 10 minutes which may be experienced in a thermal runaway event.

The at least one nonwoven layer comprising inorganic particles or inorganic fibers may further comprise intumescent material. Useful intumescent materials for use in the multilayer material according to the invention include, but are not limited to, unexpanded vermiculite ore, treated unexpanded vermiculite ore, partially dehydrated vermiculite ore, expandable graphite, mixtures of expandable graphite with treated or untreated unexpanded vermiculite ore, processed expandable sodium silicate, for example EXPANTROL insoluble sodium silicate, commercially available from 3M Company, St. Paul, Minn., USA, and mixtures thereof.

The at least one nonwoven layer comprising inorganic particles or inorganic fibers may comprise a thickness in the range of 0.1 to 20 mm. In some applications where thinner materials are used, the at least one layer comprising inorganic particles or inorganic fibers may comprise a thickness in the range of 0.2 to 4.0 mm, preferably 0.2 to 2.0 mm. The at least one layer comprising inorganic particles or inorganic fibers may comprise a weight in the range of 100 to 2500 g/m$^2$, for example 100 to 2000 g/m$^2$.

The multilayer material according to the invention may comprise at least one scrim layer. The scrim layer may be used to improve handling of the multilayer material by preventing fibers and/or particles from shedding out of the multilayer material. The scrim layer may comprise PET, PE, Melamine, inorganic material, such as, for example, E-glass. It may also or as an alternative comprise an inorganic or organic coating. The scrim layer may also comprise any other suitable material. It may be arranged next to the at least one layer comprising inorganic particles or fibers. In some embodiment, the scrim layer may encapsulate the entire multilayer material according to the invention.

The total thickness of the multilayer material may be between 0.5 and 23 mm. In some applications where thinner materials are used, the total thickness of the multilayer material between 0.7 and 5 mm. In some embodiments, the multilayer material will have a total thickness less than 3 mm, preferably less than 2 mm. It is possible to adjust the thickness of the material depending on the application where the material is used. As already stated above, the material may be flexible to improve the ease of applying the material in an assembly process. The material may also be compressible in order to improve the ease of applying the material in an assembly process.

The multilayer material may comprise a layer of organic or inorganic adhesive between the at least one inorganic fabric and the at least one layer comprising inorganic particles or inorganic fibers. The adhesive may be organic or inorganic. The adhesive may already be included either in the inorganic fabric or in the layer comprising inorganic particles or inorganic fibers. If a scrim is used in the multilayer material, the multilayer material may also comprise an adhesive between the multilayer material and a scrim. The adhesive may be organic or inorganic. It may already be included either in the scrim itself or in any of the materials used for the multilayer material.

Exemplary organic adhesives can be acrylic-based adhesives, epoxy-based adhesives, or silicone-based adhesives. The organic adhesives can be insulating adhesives, thermally conductive adhesives, flame retardant adhesives, electrically conducting adhesives, or an adhesive having a combination of conductive and flame-retardant properties. The exemplary organic adhesives used in the lamination can be contact adhesives, pressure sensitive (PSA) adhesives, B-stageable adhesives or structural adhesives. In an exemplary aspect an acrylic PSA can be used to bond together the functional layers of the thermal barrier composite material.

The exemplary inorganic adhesives of the present disclosure comprise at least 99 wt. %, preferably at least 99.9 wt. % inorganic constituents based on the total solids content of the adhesive. In some embodiments, the inorganic adhesive comprises 100 wt. % inorganic constituents based on the total solids content of the adhesive. Exemplary inorganic constituents in the inorganic adhesive can be selected from sodium silicate, lithium silicate, potassium silicate or a combination thereof.

Inorganic silicates disposed in an aqueous solutions are useful in bonding applications when applied as a thin layer on or between surfaces of other materials. The inorganic silicate solution dry to form a tough, tightly adhering inorganic bond or film that is nonflammable, resistant to temperatures up to 3000° F. (1650° C.), strong and rigid. It should be noted that silicate films can be moisture sensitive which can cause degradation.

Inorganic sodium silicates are solutions of glasses which are made by fusing varying proportions of sand ($SiO_2$) and soda ash ($Na_2CO_3$). These proportions are usually defined by a $SiO_2/Na_2O$ weight ratio. In some embodiments, the exemplary inorganic adhesives can have a $SiO_2/Na_2O$ weight ratio of 2.8-3.3.

In some embodiments, the inorganic adhesive may be a modified inorganic adhesive that comprises less than 1 wt. % of an organic additive based on the total solids content of the inorganic adhesive to improve the flexibility of the inorganic adhesive. Surprisingly, modified inorganic adhesives of the present invention that comprise less than 1.0 wt. %, preferably less than 0.5 wt. %, and more preferably less than or equal to 0.1 wt. % organic additive based on the total solids content of the inorganic adhesive showed a marked improvement in the performance (i.e. flexibility) of the multilayer material without reducing the material's flame barrier performance. The improved flexibility allows for the spooling of the exemplary multilayer materials during manufacture for more convenient processing and delivery as well as improved installation in contoured or non-planar applications. The improved flexibility of the multilayer laminated materials which utilize the modified inorganic adhesive enable bending of the material around contoured features/shapes on a battery module/pack lid. Additionally, use of the modified inorganic adhesive was found to improve the adhesive bond strength after exposure to high humidity while still maintaining desired level of torch flame performance.

The addition of even very low concentrations of organic additives in the modified inorganic adhesive (e.g. less than 1 wt. %, preferably less than 0.1 wt. % organic additive, based on the total solids content of the adhesive) reduced the Gurley stiffness of a multilayer laminate employing the modified adhesive by at least 10%, preferably by at least 15% relative to a multilayer material formed using a 100 wt. % inorganic adhesive, based on the total solids in the inorganic adhesive.

Exemplary organic additives include sugar, sugar alcohols such as sorbitol and xylitol, glycerin, polyols, polyvinyl alcohol, acrylic polymers and rubber lattices.

In some embodiments, the polymer additive is polyvinyl alcohol. In an exemplary aspect, the polyvinyl alcohol is a fully hydrolyzed polyvinyl alcohol. Surprisingly, incorporation of less than 0.1 wt. % polyvinyl alcohol into the modified inorganic adhesives of the present invention based on the total solids content of the inorganic adhesive showed a marked improvement in the performance (i.e. flexibility) of the multilayer material without reducing the material's flame barrier performance. Adding higher concentrations of polyvinyl alcohol resulted in instability of the modified inorganic adhesives. For example, 0.5 wt. % and 1 wt. % polyvinyl alcohol in the inorganic adhesive, precipitates formed in the solution immediately upon mixing and at 50 wt. % polyvinyl alcohol mixture immediately reacted and went from a flowable aqueous solution to a gel.

The organic or inorganic adhesives can be directly coated onto one of the functional layers and optionally dried or can be preformed into freestanding lamination film adhesives that can be applied to the surface of one of the functional layers prior to contacting the next functional layer. In an alternative aspect, one or more of the functional layers can be in the form of a tape having an adhesive layer (e.g. a pressure sensitive adhesive layer) already disposed on the functional material.

In some applications, the exemplary multilayer materials should be electrically insulating materials. In particular, the it may be advantageous for the multilayer materials to provide electrical insulation with a minimum dielectric breakdown voltage of 2 kV, more preferably >3 kV.

The invention also relates to a rechargeable electrical energy storage system with at least one battery cell and a multilayer material, the multilayer material being used as a thermal insulation barrier comprising at least one inorganic fabric layer and at least one layer comprising inorganic particles, inorganic fibers, or a combination thereof.

The multilayer material according to the invention may for example be used to ensure the overall safety of vehicles equipped with a rechargeable electrical energy storage system.

The multilayer material may be arranged in a rechargeable electrically energy storage system such that the inorganic fabric faces the at least one battery cell or battery cell packs. The inorganic fabric is selected such that it has a high resistance towards temperature and other impacts, as they might occur during a thermal runaway event. A high sand blast resistance and/or a high tensile strength may be indicators for such a high overall resistance. If the inorganic fabric faces the at least one battery cell or battery cell pack, the fabric may withstand the main phases of a thermal runaway event as described above (i.e. explosive venting, high pressure gas venting with particle ejection and quiet gas venting/luminous flame).

The main function of the inorganic fabric in such a scenario is to protect the other layers from the thermal and mechanical impact of those phases. The main function of the other layers in such a scenario is to provide a thermal insulation barrier, so that the high temperatures stay within the rechargeable electrical energy storage system, preferably within the defective cell or module. If the rechargeable electrical energy storage system is used in a vehicle, the main purpose of the multilayer material according to the invention is to ensure the overall safety of the vehicle equipped with the rechargeable electrical energy storage system.

The rechargeable electrical energy storage system according to the invention may provide a multilayer material which is positioned between the at least one battery cell or module and a lid of the storage system. The multilayer material may for example be fixed to the lid by an adhesive, mechanical fasteners or a combination thereof. Exemplary adhesives for attaching the multilayer materials to the lid may include transfer adhesive, double coated adhesive tape, a hot melt adhesive or a structural adhesive. In some aspects, the exemplary adhesives can be a flame retardant version of a transfer adhesive, double coated adhesive tape, a hot melt adhesive or a structural adhesive. In some aspects, the exemplary multilayer materials may be placed between the battery cells or modules and the lid. The multilayer material may, in such a position, be used as a thermal insulation barrier flame barrier and/or explosion barrier for the lid or to protect the lid and any systems, components that are arranged adjacent to the lid.

The multilayer material may also be used as a thermal insulation barrier or flame barrier for adjacent battery cells, modules or battery packs. It may also be used as a thermal insulation barrier or flame barrier for any electrical components around the battery cells or battery packs such as for example cables or bus bars. When the multilayer material provides in addition electrically insulating properties, short circuits for example due to deformation or other harm, e.g. heated electrical insulation around different battery systems, can also be prevented. Another possibility is to arrange the multilayer material such that it covers a burst plate of the at least one battery cell. Of course, the material can also be positioned such in a rechargeable electrical energy storage system that it fulfills all of the above-mentioned requirements. As already stated above, it might be advantageous to position the multilayer material according to the invention such that the inorganic fabric faces towards the at least one battery cell or module.

Also, the use of the multilayer material according to the invention is not limited to the use in a specific kind of rechargeable electrical energy storage systems. It may for example be used in rechargeable electrical energy storage system comprising prismatic battery cells, pouch cells, or cylindrical cells.

Surprisingly it has been found that the use of a multilayer material described above effectively can be used so that no external fire occurs within a rechargeable electrical energy storage system as well as heat transfer to parts around or outside of a rechargeable electrical energy storage system is contained. As will be described in the example section below, tests have shown that a multilayer material according to the invention withstands the in the Global Technical Regulation No. 20: Global Technical Regulation on the Electric Vehicle Safety (EVS) (also referred to as GTR 20).

Herein below various embodiments of the present invention are described and shown in the drawings wherein like elements are provided with the same reference numbers.

Figure 1:
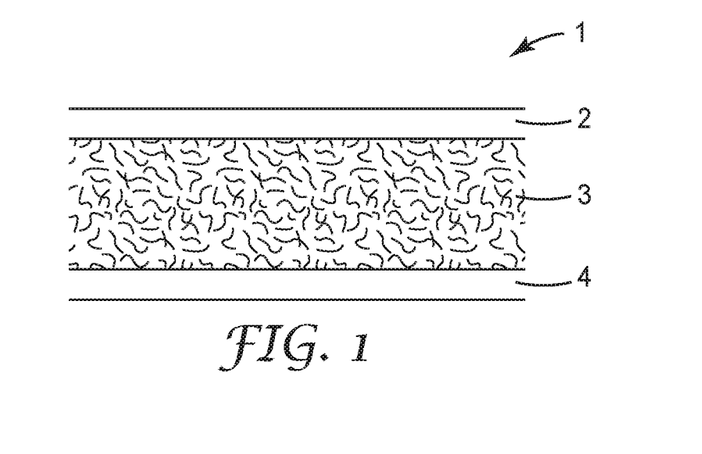
FIG. 1 is a cross-sectional view of a multilayer material according to the invention.

FIG. 1 shows a cross-sectional view of a multilayer material 1 according to the invention. The multilayer material of FIG. 1 comprises an inorganic fabric layer 2 that is attached to a fiber mat 3 which is attached to an optional scrim layer 4. The scrim layer 4 and the fabric layer 2 are arranged on either side of the fiber mat 3. The layers 2, 3, 4 may for example be attached to each other by an adhesive. The adhesive may be an organic or an inorganic adhesive.

Figure 2:
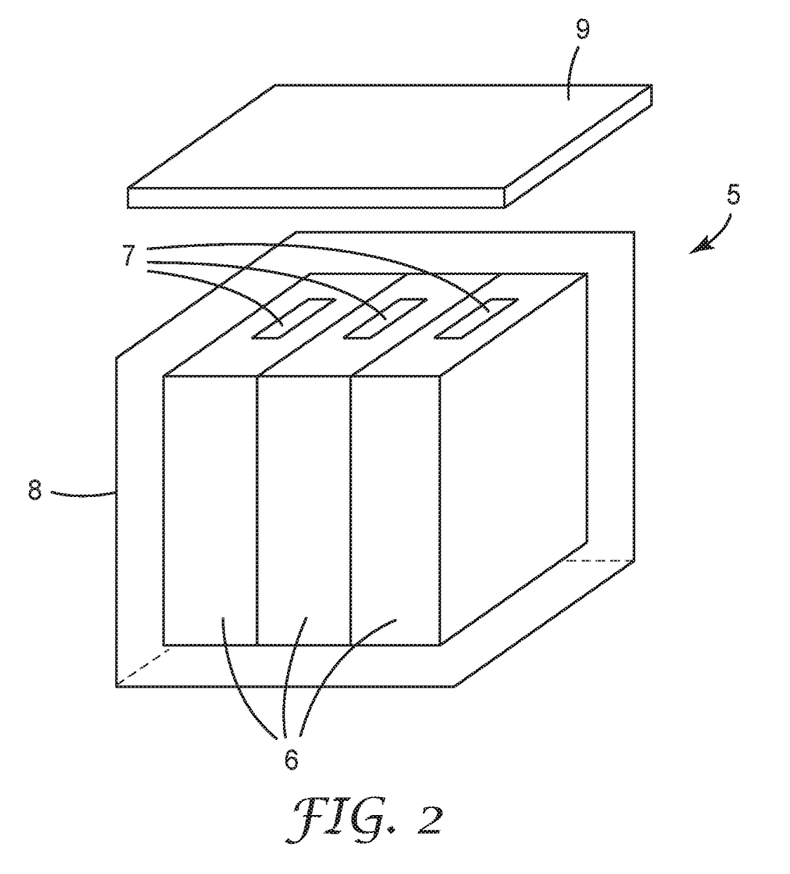
FIG. 2 is a schematic drawing of a rechargeable electrical energy storage system (REESS).

FIG. 2 is a schematic drawing of a rechargeable electrical energy storage system (REESS) 5. The system comprises prismatic battery cells 6. The prismatic battery cells 6 each comprise a burst plate 7 to release potentially generated excessive pressure through a venting hole, for example in case of a thermal runaway event. The cells 6 are arranged in a module housing 8 (which is shown with two open walls—one front wall and one side wall—that are closed in reality). The housing provides a lid 9. A plurality of module housings can be assembled into a battery pack (not shown).

As already described above regulations require that a rechargeable energy storage system is built in a way such that no external fire occurs. One area that needs to be protected is the area above the burst plates 7. Parts of the system that are arranged over the burst plate need a thermal barrier in order to avoid a burn-through of the battery and open flames outside of the system. According to the invention the multilayer material 1 shown in FIG. 1 can be placed on top of the battery cells 6 over their burst plates 7 under the lid 9 with the inorganic fabric layer 2 facing the battery cells (not shown). Additional multilayer material may be placed between the module housing 8 and the battery pack.

The multilayer material 1 may also be placed between the cells 6 (not shown). Or it may be placed between the cells 6 and the side walls or the bottom wall of the module housing 8 (not shown).

The blast and thermally resistant barrier articles described herein, in some embodiments, can be effective in mitigating the effects of thermal runaway propagation in Li-Ion batteries. These articles can also have potential uses in other commercial and industrial applications, such as automotive, residential, industrial, and aerospace applications, where it is necessary to protect people or surrounding structures from the effects of a flying debris and/or thermal fluctuations. For example, the provided blast and thermally resistant barrier articles can be incorporated into primary structures extending along or around transportation or building compartmental structures to protect users and occupants. Such applications can include protection around battery modules, fuel tanks, and any other enclosures or compartments.

The provided barrier articles generally include a core layer containing a plurality of fibers or a fire-retardant foam coupled to or with a supplementary layer. Optionally, the barrier article can include flame-retardant adhesive. These layers can be bonded to compartment walls or each other using a suitable binder. The components, configurations thereof, and test methods are described in the sub-sections that follow.

EXAMPLES

Test Methods

Nail-Penetration Test:

The nail-penetration test that was used for testing the multilayer material according to the invention was conducted as follows: The nail penetration test was done with a high capacity (120 Ah) prismatic Li-ion battery cell. One single Li-ion cell was covered on both sides with thermal insulating hard plaster FERMACEL, commercially available plates in order to keep the heat inside the cell. This sandwich construction (FERMACELL plate—battery cell—

FERMACELL plate) was fixed in-between two strong steel plates to a massive workbench. A steel-nail—X15CrNiSi25-21 nail with a diameter of 5 mm—penetrates with a speed of 25 mm/min through a hole in the steel plate into the 100% charged cell. The barrier material to be investigated was fixed at an aluminum plate in the dimension 200 by 200 by 1.5 mm. This plate was positioned above the top of the cell in a defined distance (12 mm and 20 mm). The efficiency of the barrier material was quantified by measuring the temperature with type K temperature sensors below and above the aluminum plate with the barrier material. Above the top side of the plate, a heat shield made of PERTINAX phenolic sheet was positioned in order to reduce the radiation from the back side and to avoid the heating by flames turning around.

When the nail penetrates the separator inside of the battery cell, an internal shortcut initiates a thermal runaway followed by temperature increase and decomposition of the electrolytes. After the pressure inside the cell exceeds a limit of several bars the burst plate brakes and hot gas of about 600 to 750° C. and particles are blown out under high pressure for about 45 to 60 s. For another 4 to 5 minutes the hot gas is released with reduced pressure.

Sandblast Test:

For the sandblast test a commercially available sandblast cabinet was used. The sample material was mounted to a metal sheet of the dimension 100 by 50 mm. The sample of dimension 80 by 45 mm was fixed with a masking tape on all sides to the metal sheet. A fixture inside of the cabinet held the samples in a defined position in front of the nozzle. Compressed air was used to accelerate the sandblast media onto the target until the specimen was damaged in an area of 4+/−1 mm diameter. The sanding time (in seconds (s)) was a measure for the resistance of a sample against a particle loaded air. The sample material was either not heat treated or heat treated in a laboratory kiln (L24/11/P330 of Nabertherm GmBH of Lilienthal, Germany) at 700° C. for five minutes before testing. Sandblast test conditions were as follows: 65 mm sample distance to nozzle, 4 mm nozzle diameter, Type 211 glass beads with grain size 70-110 micrometers was used as the media and the angle of impact was between 90° and 100°.

Bond Strength

Material samples were conditioned at ambient temperature and humidity or exposed to 95% relative humidity and 23° C. for at least 16 hours prior to testing. The humidity exposure was accomplished by placing the sample materials in a sealed high humidity container consisting of water and an elevated platform to keep the test samples above the water level. Humidity exposed samples were dried on laboratory drying cans available from Williams Apparatus Co, (Watertown, N.Y., USA) at 180° F. (82° C.) for about 10 minutes so that the test tape tabs could adhere well enough to the samples to perform the adhesion bond test.

Test specimen were prepared by cutting 5 in. (12.7 cm)×1.5 in. (3.8 cm) strips of the exemplary multilayer example materials. At one end of each strip, the fabric and paper layers were carefully separated with a utility knife for a length of about 1 in. (2.54 cm). A high bonding/strength tape, 3M 2960 Multi-Use duct tape available from 3M Company (St. Paul, Minn., USA), was applied over each the separated ends of the strip and the tape was folded over on itself to create a tab area that could be gripped by the jaw/clamp of a text fixture. To maximize adhesion of the test tape tabs onto the sample end, it was run thru a Chemsultants International Hot Roll Laminator nip set at 100° F./38° C. and 40 psi pressure at a 5 feet/minute speed.

The 2 tabs of the test specimen were then inserted into the jaws/clamps of a Thwing Albert QC-3A Tensile Tester Universal Testing Machine at a cross head speed of 5.08 cm/min. The force to separate the 2 layers was recorded for each specimen and an average bond strength was calculated from four duplicate measurements.

Bond retention is a ratio of the humidity aged bond strength divided by the bond strength without humidity aging expressed as a percent.

Stiffness

The Gurley Stiffness test method of ASTM D-6125 was used. Test samples were subjected to preconditioning at ambient conditions.

Tensile Test:

The tensile test methods of ISO 4606 and ASTM D-828 were used. Tensile measurements were made on non-heat treated samples.

Elmendorf Tear Strength

The test method of ASTM D-689 was used to determine tear strength. Test samples were subjected to preconditioning at ambient conditions.

Dielectric Breakdown Voltage

The test method of ASTM D-149 was used to determine dielectric breakdown voltage. Test samples were subjected to preconditioning at ambient conditions.

Flame Tests:

The methods of UL94 HB flammability testing were followed. A sample passed the test if the material was not punctured.

Torch Flame Test A was conducted using a Bernzomatic torch TS-4000 trigger equipped with a MAP Pro fuel cylinder that provides a flame temperature in air of 2054° C./3730° F. Test samples were mounted at a fixed distance of 2.75" (7 cm) from the flame with a metal clip attached at the bottom of the sample to help stabilize the sample during the test and exposed to the flame for a continuous time period of 10 minutes without puncturing the test sample. The temperature measured at the fixed distance of 2.75" (7 cm) from the flame was approximately 1000° C.

An additional higher temperature Torch Flame Test B was conducted by testing the sample at the fixed distance of 1" (2.54 cm) from the 2054° C./3730° F. flame for a continuous time period of 10 minutes without puncturing the test sample.

Materials

| Material | Description |
| --- | --- |
| INTERAM Mat | Nonwoven made from inorganic alkaline earth silicate fibers, commercially available from 3M Company, St. Paul, MN, USA |
| CEQUIN | 3M CEQUIN Inorganic Insulation Paper, commercially available from 3M Company |
| AVSil ® 84CH | AVSil ® 84CH Silica Fabric, commercially available from AVS Industries LLC, New Castle, DE, USA |
| TG 430/9KK-CS | Glass (E-glass) fabric with a calcium silicate finish, commercially available from HKO Isolier-und Textiltechnik GmbH, Oberhausen, Germany |
| SC2025 | SC2025 calcium silicate coated fiberglass fabric (texturized yarn type, plain weave, 660 gsm basis weight, 0.8 mm thickness), commercially available Unitex Composite Co. Ltd, Ningbo, China |
| TW-600-13-100 | Basalt Fabric, commercially available from Sudaglass Fiber Technology, Inc, Houston, TX, USA |

| Material | Description |
| --- | --- |
| Micashield DM338S | DM338S, Dupré Minerals Ltd, Stafforshire, England |
| KSS | K® Sodium Silicate ($SiO_2/Na_2O$ weight ratio of 2.88, 42.7% solids, Viscosity 960 cps), commercially available from PQ Corporation, Valley Forge, PA, USA |
| STIXSO RR | Sodium Silicate Solution ($SiO_2/Na_2O$ weight ratio of 2.88, 39.2% solids, viscosity 830 cps), commercially available from PQ Corporation, Valley Forge, PA, USA |
| Glycerin | Glycerin, commercially available from Now Solutions, Bloomingdale, IL, USA |
| SELVOL 9-325 | Fully hydrolyzed, pre-mixed Polyvinyl Alcohol Solution (8-9% solids, viscosity 200-1300 cps), commercially available from Sekisui Specialty Chemicals America, LLC, Dallas, TX USA |
| RHOPLEX E-358 | RHOPLEX™ E-358 Water-Borne Binder (Acrylic emulsion, pH 7.0, 60% solids by weight, Brookfield viscosity at 25° C.-300 cps), commercially available from Dow Chemical Company, Midland, MI, USA |

Preparation of Modified Inorganic Adhesives

The modified inorganic adhesives were prepared by combining the sodium silicate and the selected organic additive in a laboratory blender at room temperature. Modified adhesive composition data is provided in Table 4.

Comparative Example 1 (CE1)

Comparative Example 1 was coated with Micashield D338S by using a 3M Accuspray ONE Spray Gun system with atomizing head of 1.8 mm size. The sample was dried at 80° C. for 30 minutes. The mica layer had a dry weight of about 30 gsm. Sample constructions are represented in Table 1 and test performance data are provided in Table 2.

Comparative Example 2 (CE2)

A multilayer laminate was prepared by using a #30 Mayer rod to draw down and apply a RHOPLEX E-358 acrylic emulsion onto a 15 mil CEQUIN I inorganic insulating paper material. A TG 430/9KK-CS Calcium silicate coated glass fabric was then placed on top and then rolled with a 4.54 kg (10 lbs.) roller. The multilayer laminate was then dried at 82° C. (180° F.) for five minutes. The sample construction is represented in Table 4 and test performance data are provided in Table 5.

Comparative Example 3 (CE3)

A sample of the 15 mil CEQUIN I Inorganic Insulation Paper was subjected to the 1000° C. Flame Test (Flame test A). The sample failed with the flame burning through in 45 seconds.

Comparative Example 4 (CE4)

A sample of the 20 mil CEQUIN I Inorganic Insulation Paper was subjected to the 1000° C. Flame Test (Flame test A). The sample failed with the flame burning through in 189 seconds.

A sample of the 20 mil CEQUIN I Inorganic Insulation Paper was subjected to the 2000° C. Flame Test (Flame test B). The sample failed with the flame burning through in 19 seconds.

Comparative Example 5 (CE5)

A sample of the TG 430/9KK-CS Calcium silicate coated glass fabric was subjected to the 1000° C. Flame Test (Flame test A). The sample failed with the flame burning through in 9 seconds.

A sample of the TG 430/9KK-CS Calcium silicate coated glass fabric was subjected to the 2000° C. Flame Test (Flame test B). The sample failed with the flame burning through in 3 seconds.

The dielectric breakdown strength of a sample of the TG 430/9KK-CS Calcium silicate coated glass fabric was measured to be 0.39 kV.

Comparative Example 6 (CE6)

A sample of the TW-600-13-100 basalt fabric passed 1000° C. Flame Test (Flame test A), but failed 2000° C. Flame Test (Flame test B) with the flame burning through in 5 seconds.

The dielectric breakdown strength of a sample of the TW-600-13-100 basalt fabric was measured to be 0.18 kV.

Examples 1-3 (EX1-EX3)

The multilayer laminates of Examples 1-3 were prepared by spraying 3M Display Mount spray adhesive onto a fabric. A fiber mat was placed the fabric on top and then rolled with a 4.54 kg (10 lbs.) roller. Sample constructions are represented in Table 1 and test performance data are provided in Table 2.

Examples 4-6 (EX4-EX6)

The multilayer laminates of Examples 4-6 were prepared by using a #30 Mayer rod to draw down and apply K® sodium silicate adhesive onto a CEQUIN I inorganic insulating paper material. The inorganic fabric layer was then placed on top of the inorganic adhesive layer and then rolled with a 4.54 kg (10 lbs.) roller. The multilayer laminate was then dried at 82° C. (180° F.) for five minutes. For example, EX6, a second layer of the K® sodium silicate adhesive was applied to the other side of the CEQUIN I inorganic insulating paper using a #30 Mayer rod. A second inorganic fabric layer was then placed on top of the second inorganic adhesive layer, rolled down with a 4.54 kg (10 lbs.) roller and dried at 82° C. (180° F.) for five minutes. Sample constructions are represented in Table 1, selected physical, mechanical and electrical properties are provided in Table 2, and Thermal/flame barrier test performance data are provided in Table 3.

TABLE 1

Sample Constructions for Examples 1-6 and Comparative Examples

| Example | Inorganic fabric | Adhesive | Inorganic core layer |
| --- | --- | --- | --- |
| EX1 | Silica fabric AVSil® 84CH 6010 gsm, 0.76 mm | Spray Adhesive | INTERAM Mat 800 gsm |
| EX2 | TG 430 fabric 430 gsm, 0.44 mm | Spray Adhesive | INTERAM Mat 400 gsm |
| EX3 | TG 430 fabric 430 gsm, 0.44 mm | KSS | CEQUIN I Inorganic paper 15 mil (0.38 mm, 410 gsm) |
| EX4 | TW-600-13-100 fabric, 600 gsm, 0.55 mm | KSS | CEQUIN I Inorganic paper 20 mil (0.51 mm, 540 gsm) |

TABLE 1-continued

Sample Constructions for Examples 1-6 and Comparative Examples

| Example | Inorganic fabric | Adhesive | Inorganic core layer |
|---|---|---|---|
| EX5 | TG 430 fabric 430 gsm, 0.44 mm | KSS | CEQUIN I Inorganic paper 20 mil (0.51 mm, 540 gsm) |
| EX6 | 2 layers of TG 430 fabric 430 gsm, 0.44 mm | KSS | CEQUIN I Inorganic paper 20 mil (051 mm, 540 gsm) |
| CE1 | Micashield DM338S | N/A | INTERAM Mat 800 gsm |

TABLE 2

Physical, mechanical and electrical properties of exemplary materials

| Property | Units | EX3 | EX4 | EX5 | EX6 | CE2 | 15 mil CeQUIN Paper[#] | 20 mil CeQUIN Paper[#] |
|---|---|---|---|---|---|---|---|---|
| Thickness | mm | 0.71 | 0.95 | 0.82 | 1.23 | 0.72 | 0.38 | 0.51 |
| Basis Weight | g/m2 | 846 | 1103 | 971 | 1391 | 830 | 410 | 540 |
| Density (Calculated) | g/cm3 | 1.19 | 1.16 | 1.18 | 1.13 | 1.15 | 1.07 | 1.06 |
| Tensile strength, MD | N/cm | NM | 833 | 956 | 937 | 712 | 28 | 35 |
| Elongation, MD | % | NM | 5.1 | 4.1 | 5.9 | 5.03 | <2 | <2 |
| Tensile strength, CD | N/cm | 512 | 648 | 446 | 741 | 406 | 14 | 21 |
| Elongation, CD | % | 4.3 | 3.5 | 3.8 | 5.24 | 3.49 | <2 | <2 |
| Elmendorf tear strength, MD | g | >3200 | >3200 | >3200 | NM | >3200 | 220 | 312 |
| Elmendorf tear strength, CD | g | >3200 | >3200 | >3200 | NM | >3200 | 310 | 330 |
| Dielectric breakdown voltage | kV | 3.8 | 4.0 | 4.1 | 7.3 | 4.28 | 2.6 | 3.2 |
| Gurley Stiffness, MD | mg | 16,894 | NM | 28,804 | NM | 11,516 | | |
| Gurley Stiffness, CD | mg | 12,812 | NM | 18,669 | NM | 7,023 | | |

[#]Data was obtained from the product data sheets

TABLE 3

Methods and Results of Examples 1-6 and Comparative Example CE1

| | Nail-Penetration Test | Sandblast Test | | Tensile | | | | |
|---|---|---|---|---|---|---|---|---|
| | Heat Transmission Factor (%) | No Heat Treatment (s) | Heat Treated (s) | Warp Direction (N/5 cm) | Weft Direction (N/5 cm) | Flame Test | Torch Flame Test A | Torch Flame Test B |
| EX1 | Pass | 20 | 101 | 39 | 3000 | 1900 | Pass | NM | NM |
| EX2 | Pass | 19 | 124 | 25 | 2700 | 1700 | Pass | NM | NM |
| EX3 | Pass | 38 | 124 | 25 | 2700 | 1700 | Pass | Pass | Fail |
| EX4 | Pass | NM | NM | NM | 4200 | 3200 | NM | Pass | Fail |
| EX5 | Pass | NM | NM | NM | 4800 | 3300 | NM | Pass | Fail (6 min) |
| EX6 | Yes | NM | NM | NM | 4700 | 3700 | NM | Pass | Pass |
| CE1 | No | 50 | 2 | 1 | NM | NM | Pass | NM | NM |

NM - not measured

The comparative examples CE3-CE5 show that the individual fabric and paper layers by themselves are not able to pass the torch flame testing (Flame test A/Flame test B). Comparative example CE6 passed Flame test A, but failed Flame test B with a hole forming through the fabric in 5 seconds. As mentioned previously, the exemplary barrier materials also need to be electrically insulating and the low dielectric breakdown strength of the basalt fabric makes it unsuitable for use alone as a flame barrier material for the prescribed application. Comparative example CE2, which combines an inorganic paper layer with a coated glass fabric layer with an acrylic adhesive, also failed to pass the torch flame testing (Flame test A/Flame test B—See Table 5). In contrast, the exemplary multilayer materials of the present invention in which the inorganic fabric layer is attached to the inorganic paper layer with an inorganic adhesive provide the necessary balance of properties allowing them to be used as a barrier material in automotive or other electrified transportation applications and stationary energy storage applications.

Gurley Stiffness data were measured for Examples EX3 and EX5 in the machine direction and cross-web direction. Gurley Stiffness for EX3 was measured to be 16,894 mg in the machine direction and 12,812 mg in the cross-web direction. Gurley Stiffness for EX5 was measured to be 28,804 mg in the machine direction and 18,669 mg in the cross-web direction. Comparing these values to the Gurley stiffness data for CE2 (11,516 mg in the machine direction and 7,023 mg in the cross-web direction) illustrate the rigidizing effects of using an inorganic adhesive to laminate the layers of the exemplary multilayer materials together.

While Example 5 survived the lower temperature Torch Flame Test A, it did not survive the higher temperature Torch Flame Test B. However, it was unexpected that adding an additional fabric layer so that the fabric layer was on both sides of the inorganic based paper layer (CEQUIN) allowed the Example 6 laminate to pass the much higher temperature Torch Flame B test.

Examples 7-13 (EX7-EX13)

Multilayer laminates of Examples 7-13 were prepared by using a #30 Mayer rod to draw down and apply the inorganic or modified inorganic adhesive onto a 20 mil CEQUIN I inorganic insulating paper material. A layer of TG 430 glass cloth fabric was then placed on top and rolled down with a 4.54 kg (10 lbs.) roller. The multilayer laminate was dried at 180° F. (82° C.) for 5 minutes. Example 14 was prepared following the same procedure as Example EX7-EX13 except that SC2025 calcium silicate coated fiberglass fabric was bonded to 20 mil CEQUIN I inorganic insulating paper material with a KSS inorganic adhesive in place of TG430 glass cloth fabric. Sample constructions are represented in Table 4 and test performance data are provided in Table 5.

TABLE 4

Sample Constructions for Examples 7-14 and Comparative Examples

| Example | Lamination Adhesive* | Laminate Basis Weight (gsm) | Laminate Thickness (mm) |
|---|---|---|---|
| EX7 | 100 wt. % KSS | 938.5 | 0.88 |
| EX8 | 99.96 wt. % KSS and 0.04 wt. % SELVOL 9-325 | 896.7 | 0.92 |
| EX9 | 95 wt. % KSS and 5 wt. % Glycerin | 953.7 | 0.89 |
| EX10 | 90 wt. % KSS and 10 wt. % RHOPLEX E-358 | 893.5 | 0.83 |
| EX11 | 99.96 wt. % KSS and 0.04 wt. % RHOPLEX E-358 | 932.5 | 0.90 |
| EX12 | 100 wt. % SSTIXSO RR | 928.7 | 0.83 |
| EX13 | 99.96 wt. % SSTIXSO RR and 0.04 wt. % SELVOL 9-325 | 946.6 | 0.82 |
| EX14 | 100 wt. % KSS | 1264 | 1.3 |
| CE2 | 100 wt. % RHOPLEX E-358 | 830 | 0.72 |

*weight percent values are based on the total solids content in the inorganic adhesive Examples 15-16 (EX15-EX16)

Example 15 was prepared by using a #30 Mayer rod to draw down and apply a first 100 wt. % KSS inorganic adhesive layer onto the 20 mil CeQUIN I inorganic insulating paper. A first layer of TG 430 glass cloth fabric was then placed on top of the first inorganic adhesive layer and rolled down with a 4.54 kg (10 lbs.) roller. The multilayer laminate was dried at 180° F. (82° C.) for 5 minutes. Next, a second layer of the KSS adhesive was applied to the other side of the CEQUIN I inorganic insulating paper using a #30 Mayer rod. A second inorganic TG 430 glass cloth fabric layer was then placed on top of the second inorganic adhesive layer, rolled down with a 4.54 kg (10 lbs.) roller and dried at 82° C. (180° F.) for five minutes. The basis weight for the resulting multilayer laminate was 1415.9 gsm and the total sample thickness was 1.48 mm. Test performance data are provided in Table 5.

Example 16 was prepared by using a #30 Mayer rod to draw down and apply a first modified inorganic adhesive layer comprising 99.96 wt. % KSS and 0.04 wt. % SELVOL 9-325 onto the first side of 20 mil CeQUIN I inorganic insulating paper. A first layer of TG 430 glass cloth fabric was then placed on top of the inorganic adhesive layer and rolled down with a 4.54 kg (10 lbs.) roller. The multilayer laminate was dried at 180° F. (82° C.) for 5 minutes. Next, a second modified inorganic adhesive layer was applied to the other side of the CEQUIN I inorganic insulating paper using a #30 Mayer rod. A second inorganic TG 430 glass cloth fabric layer was then placed on top of the second inorganic adhesive layer, rolled down with a 4.54 kg (10 lbs.) roller and dried at 82° C. (180° F.) for five minutes. The basis weight for the resulting multilayer laminate was 1345.4 gsm and the total sample thickness was 1.43 mm. Test performance data are provided in Table 5.

TABLE 5

Test Methods and Results of Examples EX7-EX16

| | Laminate Bond Strength (N/25 mm) | | | Gurley Stiffness (mg) | | Torch Test A | | Torch Test B | |
|---|---|---|---|---|---|---|---|---|---|
| Example | Ambient | After High Humidity Exposure | Bond Retention | MD Stiffness | Relative to KSS | Ambient | After High Humidity Exposure | Ambient | After High Humidity Exposure |
| EX7 | 14 | 5.3 | 38% | 19,736 | — | Pass | Pass | NM | NM |
| EX8 | 12 | 9.4 | 78% | 16,358 | 17.1%[1] | Pass | Pass | NM | NM |
| EX9 | 13 | 3.2 | 24% | 19,202 | 2.7%[1] | Pass | Pass | NM | NM |
| EX10 | 13 | 5.0 | 38% | 16,358 | 17.1%[1] | Pass | Fail (at 7 min) | NM | NM |
| EX11 | NM | NM | NM | 19,558 | 0.9%[1] | Pass | Pass | NM | NM |
| EX12 | 9.5 | 4.8 | 51% | 16,891 | 66.5%[1] | Pass | Pass | NM | NM |
| EX13 | 6.8 | 4.0 | 60% | 23,825 | −41.1%[1] | Pass | Pass | NM | NM |
| EX14 | NM | NM | NM | NM | NM | Pass | NM | NM | NM |
| EX15 | 13 | 5.0 | 38% | 58,141 | — | Pass | Pass | Pass | Pass |

TABLE 5-continued

Test Methods and Results of Examples EX7-EX16

| | Laminate Bond Strength (N/25 mm) | | | Gurley Stiffness (mg) | | Torch Test A | | Torch Test B | |
|---|---|---|---|---|---|---|---|---|---|
| | | After High | | | | | After High | | After High |
| Example | Ambient | Humidity Exposure | Bond Retention | MD Stiffness | Relative to KSS | Ambient | Humidity Exposure | Ambient | Humidity Exposure |
| EX16 | 12 | 9.4 | 78% | 50,495 | 13.2%[2] | Pass | Pass | Pass | Pass |
| CE2 | NM | NM | NM | 11,516 | NM | Fail | NM | Fail | NM |

[1]Relative stiffness derived by comparing to stiffness of the multilayer material of example EX7
[2]Relative stiffness derived by comparing to stiffness of the multilayer material of example EX14

Glycerin is a known plasticizer for silicate adhesives at a concentration range of 1-5 wt. % based on the total solids content in the inorganic adhesive. However, the multilayer material of EX9, which utilized a modified inorganic adhesive with 5 wt. % glycerin, showed a much smaller stiffness reduction (2.7% vs. 17.1%) at a higher loading compared to the multilayer material of EX8 utilized a modified inorganic adhesive with 0.04 wt. % polyvinyl alcohol. The addition of 5 wt. % glycerin also reduced bond strength recovery retention after high humidity exposure.

An acrylic modification to the inorganic adhesive was evaluated in EX10. Acrylic adhesives are frequently used as laminating adhesives in multilayer laminate constructions. A 10 wt. % acrylic binder modification to the inorganic adhesive produced comparable reduction in laminate stiffness compared to the multilayer material of EX8 utilized a modified inorganic adhesive with 0.04 wt. % polyvinyl alcohol. However, after high humidity exposure, the 10 wt. % acrylic modified K sodium silicate laminate failed the 1000° C. Torch Flame test (Torch test A) at about 7 minutes of exposure to the flame.

A simple mandrel bend test was conducted with examples EX15 and EX16. Ex15 multilayer material was visually and tactilely observed to buckle when wrapped around a 6-inch mandrel while the EX16 multilayer material wrapped smoothly around the 6-inch mandrel.

Due to the wide variety of battery cells, battery module and battery cell pack designs, materials with a wide variety of performance properties could be applicable depending on how they are incorporated in the design.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

The invention claimed is:

1. A multilayer material for use as a thermal insulation barrier in a rechargeable electrical energy storage system, the multilayer material comprising:
   at least one inorganic fabric layer;
   a nonwoven layer comprising inorganic particles and inorganic fibers; and
   an inorganic adhesive layer, located between the at least one inorganic fabric layer and the nonwoven layer, the inorganic adhesive layer comprising:
   inorganic constituents present in an amount of at least 99 wt. %, and
   an organic additive present in an amount of at least 0.01 wt. % and less than 1 wt. %, the organic additive is selected from the group consisting of a sugar, a sugar alcohol, glycerin, a polyol, a polyvinyl alcohol, an acrylic polymers, and a rubber lattices,
   wherein wt. % is based on a total solids content of the inorganic adhesive layer, and
   wherein the at least one inorganic fabric layer and the nonwoven layer are bonded via the inorganic adhesive layer.

2. The multilayer material according to claim 1, wherein the inorganic fabric layer comprises E-glass fibers, R-glass fibers, ECR-glass fibers, basalt fibers, leached and ion-exchanged fibers, ceramic fibers, silicate fibers, steel filaments or a combination thereof.

3. The multilayer material according to claim 1, wherein the inorganic fabric layer is a glass fiber fabric.

4. The multilayer material according to claim 3, wherein the glass fiber fabric is coated with a calcium silicate coating.

5. The multilayer material according to claim 1, wherein the nonwoven layer comprises E-glass fibers, S-glass fibers, R-glass fibers, ECR-glass fibers, basalt fibers, ceramic fibers, polycrystalline fibers, non-bio-persistent fibers, alumina fibers, silica fibers or a combination thereof.

6. The multilayer material according to claim 1, wherein the nonwoven layer comprises an inorganic paper or an inorganic board.

7. The multilayer material according to claim 1, wherein the nonwoven layer is an inorganic insulating paper, the insulating paper comprising glass fibers and microfibers, inorganic particles and an organic adhesive binder.

8. A multilayer material for use as a thermal insulation barrier in a rechargeable electrical energy storage system, the multilayer material comprising:
   an inorganic paper comprising:
     glass fibers and microfibers,
     inorganic particles, and
     an organic binder;
   a surface coated glass fiber fabric layer; and
   an inorganic adhesive layer located between the inorganic paper and the surface-coated glass fiber fabric layer, the inorganic adhesive layer comprising:
     inorganic constituents present in an amount of at least 99 wt %; and
     an organic additive present in an amount of at least 0.01 wt. % and less than 1 wt. %, the organic additive is selected from the group consisting of a sugar, a sugar alcohol, glycerin, a polyol, a polyvinyl alcohol, an acrylic polymers, and a rubber lattices, wherein wt. % is based on a total solids content of the inorganic adhesive layer, and wherein the surface coated glass fiber fabric layer is bonded to a major surface of the inorganic paper via the inorganic adhesive layer.

9. The multilayer material according to claim 8, wherein the surface-coated glass fiber fabric layer is coated with a calcium silicate coating.

10. The multilayer material according to claim 8, wherein the inorganic constituents are present in an amount of at least 99.9 wt. % and the organic additive is present in an amount of 0.01-0.1 wt. %, wherein wt. % is based on a total solids content of the inorganic adhesive layer.

11. The multilayer material according to claim 1, wherein the organic additive is a polyvinyl alcohol.

12. The multilayer material according to claim 8, wherein the surface coated glass fiber fabric layer is characterized by a thickness in the range of 0.3 to 3 mm and a basis weight of above 400 g/m².

13. The multilayer material according to claim 8, characterized by a total thickness of 0.7 to 5 mm.

14. The multilayer material according to claim 1, further comprising at least two inorganic fabric layer, each of the at least two inorganic fabric layer bonded to the nonwoven layer via the inorganic adhesive layer.

15. A multilayer material for use as a thermal insulation barrier in a rechargeable electrical energy storage system, the multilayer material comprising:
  a first inorganic fabric layer,
  a nonwoven layer comprising inorganic particles and inorganic fibers; and
  a second inorganic fabric layer; and
  a first inorganic adhesive layer and a second inorganic adhesive layer, the first adhesive layer and the second adhesive layer comprising:
    inorganic constituents present in an amount of at least 99 wt. %, and
    an organic additive present in an amount of at least 0.01 wt. % and less than 1 wt. %, the organic additive is selected from the group consisting of sugar, sugar alcohols, glycerin, polyols, polyvinyl alcohol, acrylic polymers and rubber lattices,
  wherein wt % is based on a total solids content of the inorganic adhesive layer;
  wherein the first inorganic adhesive layer is located between the first organic fabric layer and the nonwoven layer and the first inorganic adhesive layer bonds the first organic fabric layer to the nonwoven layer at a first major surface, and
  wherein the second inorganic adhesive layer is located between the second inorganic fabric layer and the nonwoven layer and the second inorganic adhesive layer bonds the second inorganic fabric layer and the nonwoven layer at a second major surface.

16. A rechargeable electrical energy storage system, comprising:
  at least one battery cell; and
  a multilayer material of claim 1,
  wherein the multilayer material provides a flame barrier during a thermal runaway event.

17. The rechargeable electrical energy storage system according to claim 16, wherein the multilayer material is arranged such that the inorganic fabric layer is facing the at least one battery cell.

18. The rechargeable electrical energy storage system according to claim 16, further comprising a lid, wherein the multilayer material is positioned between the at least one battery cell and the lid.

19. The rechargeable electrical energy storage system according to claim 18, further comprising an adhesive, wherein the multilayer material is attached to the lid with the adhesive.

* * * * *